US006785390B1

(12) United States Patent
Hiraide

(10) Patent No.: US 6,785,390 B1
(45) Date of Patent: Aug. 31, 2004

(54) SYSTEM AND METHOD FOR ASYNCHRONOUS DECRYPTION

(75) Inventor: Hiroyuki Hiraide, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/571,465

(22) Filed: May 16, 2000

(30) Foreign Application Priority Data

May 18, 1999 (JP) ........................................ P11-137204

(51) Int. Cl.[7] .................................................. H04L 9/00
(52) U.S. Cl. ........................ 380/262; 380/281; 380/284
(58) Field of Search ................................ 380/277–286, 380/273, 262

(56) References Cited

U.S. PATENT DOCUMENTS 3,953,677 A * 4/1976 Gannett ....................... 380/41
5,703,948 A * 12/1997 Yanovsky .................. 380/262

* cited by examiner

*Primary Examiner*—Gregory Morse
*Assistant Examiner*—Jacob Lipman
(74) *Attorney, Agent, or Firm*—Lerner, David, Littenberg, Krumholz & Mentlik, LLP

(57) ABSTRACT

A system and method of receiving and decrypting encrypted data using a key based upon an initial key used for encryption that is received at a receiving unit whereby a key is generated from the initial encryption key for decryption. The key used to encrypt the data at a transmitting unit periodically changes and is indicated to the receiving unit by using an odd or even flag that is attached to the encrypted data. By observing the flag and whether the flag polarity is odd or even, a new key corresponding to the key used for encryption is generated to provide uninterrupted reception of asynchronously transmitted data.

7 Claims, 9 Drawing Sheets

1
IRD
12
11
TIME-VARIABLE GENERATING CIRCUIT
CONTROL CIRCUIT
13
14
ATRAC DATA
ENCRYPTION CIRCUIT
ENCRYPTED DATA
ODD / EVEN FLAG
IEEE-1394 INTERFACE
2
IEEE-1394 INTERFACE
ENCRYPTED DATA
ODD / EVEN FLAG
CONTROL CIRCUIT
22
21
KEY GENERATING CIRCUIT
23
DECRYPTION CIRCUIT
24
MD DECK
3
ATRAC DATA (A) TIME VARIABLE (ENCRYPTION KEY) AT TRANSMITTING SIDE
K0(Even)
K1(Odd)
K2(Even)
(B) ENCRYPTION OUTPUT AT TRANSMITTING SIDE
Even
Odd
Even
(C) DECRYPTION-CIRCUIT INPUT AT RECEIVING SIDE
Even
Odd
Even
Od (A) TIME VARIABLE (ENCRYPTION KEY) AT TRANSMITTING SIDE
(B) ENCRYPTION OUTPUT AT TRANSMITTING SIDE
(C) DECRYPTION-CIRCUIT INPUT AT RECEIVING SIDE
(D) CONDITION 1
(E) CONDITION 2
(F) CONDITION 3
ts3
tr3
ts1
tr1
ts2
tr2
K0(Even)
K1(Odd)
K2(Even)
Even
Odd
Even
Even
Odd
Even
K1(Odd)
K1(Odd)
K1(Odd)
Kd
Kd
Kd

SYSTEM AND METHOD FOR ASYNCHRONOUS DECRYPTION

BACKGROUND OF THE INVENTION

The present invention relates to a system and method of receiving and decrypting encrypted data using a key for decryption that is generated from a key used for encryption that is changed periodically.

Recently, personal computers, digital cameras, audio electronics and other such units have been developed which can send data to each other through high data rate buses, such as that specified in IEEE-1394, more commonly known as FireWire. It is said that electronic units accepting high data rate buses will become commonplace.

When data is transferred between such electronic units, it is necessary to prevent the data transferred through an IEEE-1394 bus from being illegitimately intercepted and used by an electronic unit other than the intended receiving unit. Therefore, the transmitting unit typically encrypts the data to be transmitted, with a value that is incremented by one at a predetermined time interval (several seconds to several tens of seconds) that is used as an encryption key and adds a flag (ODD/EVEN flag) indicating whether the encryption key used during encryption is an odd or even number. The transmitting unit transmits the encrypted data and further sends the value used as the encryption key during encryption only to the electronic unit (receiving side) serving as the transmission destination at times not synchronized with encrypted-data communication.

When the encrypted data and the encryption key used for encrypting the data are transmitted asynchronously as described above, the received encrypted data does not correspond to the received encryption key at the receiving side in some cases and as a result, the received encrypted data cannot be decrypted.

SUMMARY OF THE INVENTION

The present invention has been made in consideration of the above situation. Accordingly, it is an object of the present invention to allow encrypted data to be decrypted with the use of a corresponding encryption key received asynchronously with the encrypted data by updating the received encryption key according to a predetermined method.

The foregoing object is achieved in one aspect of the present invention through the provision of a receiving apparatus for receiving encrypted data encrypted by an encryption key updated periodically that includes an obtaining means for obtaining an initial value of the encryption key; generating means for generating a decryption key according to the initial value of the encryption key obtained by the obtaining means; receiving means for receiving the encrypted data; reading means for reading a flag attached to the encrypted data received by the receiving means; detecting means for detecting the change and the polarity of the change of the flag read by the reading means; updating means for updating the decryption key generated by the generating means in synchronization with the change of the flag detected by the detecting means and in response to the polarity of the change of the flag; storage means for storing the number of the decryption keys updated by the updating means corresponding to the number of the states of the flag; and decrypting means for decrypting the encrypted data received by the receiving means by the use of the decryption key corresponding to the flag read by the reading means among the number of the decryption keys stored by the storage means corresponding to the number of the states of the flag.

The foregoing object is achieved in another aspect of the present invention through the provision of a receiving method for a receiving apparatus for receiving encrypted data encrypted by an encryption key updated periodically, including an obtaining step of obtaining the initial value of the encryption key; a generating step of generating a decryption key according to the initial value of the encryption key obtained in the obtaining step; a receiving step of receiving the encrypted data; a reading step of reading a flag attached to the encrypted data received in the receiving step; a detecting step of detecting the change and the polarity of the change of the flag read in the reading step; an updating step of updating the decryption key generated in the generating step in synchronization with the change of the flag detected in the detecting step and in response to the polarity of the change of the flag; a storage step of storing the number of the decryption keys updated in the updating step corresponding to the number of the states of the flag; and a decrypting step of decrypting the encrypted data received in the receiving step by the use of the decryption key corresponding to the flag read in the reading step among the number of the decryption keys stored in the storage step corresponding to the number of the states of the flag.

The foregoing object is achieved in still another aspect of the present invention through the provision of a medium for making a computer execute a program which receives encrypted data encrypted by an encryption key updated periodically, the program including an obtaining step of obtaining the initial value of the encryption key; a generating step of generating a decryption key according to the initial value of the encryption key obtained in the obtaining step; a receiving step of receiving the encrypted data; a reading step of reading a flag attached to the encrypted data received in the receiving step; a detecting step of detecting the change and the polarity of the change of the flag read in the reading step; an updating step of updating the decryption key generated in the generating step in synchronization with the change of the flag detected in the detecting step and in response to the polarity of the change of the flag; a storage step of storing the number of the decryption keys updated in the updating step corresponding to the number of the states of the flag; and a decrypting step of decrypting the encrypted data received in the receiving step by the use of the decryption key corresponding to the flag read in the reading step among the number of the decryption keys stored in the storage step corresponding to the number of the states of the flag.

In the receiving apparatus, the receiving method, and the program of the medium, the initial value of an encryption key is obtained and a decryption key is generated according to the initial value of the obtained encryption key. Encrypted data is received, a flag attached to the received encrypted data is read, and the change and the polarity of the change of the read flag are detected. The generated decryption key is updated in synchronization with the change of the detected flag and in response to the polarity of the change of the flag, the number of the updated decryption keys corresponding to the number of the states of the flag are stored, and the received encrypted data is decrypted by the use of the decryption key corresponding to the read flag among the number of the stored decryption keys corresponding to the number of the states of the flag. Since the decryption key is updated in synchronization with the change of the detected flag and in response to the polarity of the change of the flag, encrypted data can be decrypted by using the encryption key transferred asynchronously with the encrypted data.

The foregoing object is achieved in yet another aspect of the present invention through the provision of a receiving apparatus for receiving encrypted data encrypted by an encryption key updated periodically, including obtaining means for obtaining the initial value of the encryption key; generating means for generating a decryption key according to the initial value of the encryption key obtained by the obtaining means; receiving means for receiving the encrypted data; reading means for reading a flag attached to the encrypted data received by the receiving means; storage means for storing the number of the decryption keys generated by the generating means corresponding to the number of the states of the flag; decrypting means for decrypting the encrypted data received by the receiving means by the use of the decryption key corresponding to the flag read by the reading means among the number of the decryption keys stored by the storage means corresponding to the number of the states of the flag; updating means for updating the decryption key in synchronization with the change of the flag read by the reading means; checking means for periodically checking that the encryption key matches the decryption key; and changing means for changing the decryption key according to the result of the checking achieved by the checking means.

The foregoing object is achieved in a further aspect of the present invention through the provision of a receiving method for a receiving apparatus for receiving encrypted data encrypted by an encryption key updated periodically, including an obtaining step of obtaining the initial value of the encryption key; a generating step of generating a decryption key according to the initial value of the encryption key obtained in the obtaining step; a receiving step of receiving the encrypted data; a reading step of reading a flag attached to the encrypted data received in the receiving step; a storage step of storing the number of the decryption keys generated in the generating step corresponding to the number of the states of the flag; a decrypting step of decrypting the encrypted data received in the receiving step by the use of the decryption key corresponding to the flag read in the reading step among the number of the decryption keys stored in the storage step corresponding to the number of the states of the flag; an updating step of updating the decryption key in synchronization with the change of the flag read in the reading step; a checking step of periodically checking that the encryption key matches the decryption key; and a changing step of changing the decryption key according to the result of the checking achieved in the checking step.

The foregoing object is achieved in a still further aspect of the present invention through the provision of a medium for making a computer execute a program which receives encrypted data encrypted by an encryption key updated periodically, the program including an obtaining step of obtaining the initial value of the encryption key; a generating step of generating a decryption key according to the initial value of the encryption key obtained in the obtaining step; a receiving step of receiving the encrypted data; a reading step of reading a flag attached to the encrypted data received in the receiving step; a storage step of storing the number of the decryption keys generated in the generating step corresponding to the number of the states of the flag; a decrypting step of decrypting the encrypted data received in the receiving step by the use of the decryption key corresponding to the flag read in the reading step among the number of the decryption keys stored in the storage step corresponding to the number of the states of the flag; an updating step of updating the decryption key in synchronization with the change of the flag read in the reading step; a checking step of periodically checking that the encryption key matches the decryption key; and a changing step of changing the decryption key according to the result of the checking achieved in the checking step.

In the receiving apparatus, the receiving method, and the program of the medium, the initial value of an encryption key is obtained, and a decryption key is generated according to the initial value of the obtained encryption key. Encrypted data is received, a flag attached to the received encrypted data is read, the number of the generated decryption keys corresponding to the number of the states of the flag are stored, and the received encrypted data is decrypted by the use of the decryption key corresponding to the read flag among the number of the stored decryption keys corresponding to the number of the states of the flag. In addition, the decryption key is updated in synchronization with the change of the read flag, whether the encryption key matches the decryption key is checked periodically, and the decryption key is updated according to the result of the checking. The encryption key is periodically checked with the decryption key for a match whereby the decryption key is updated according to the result of the checking, encrypted data can be decrypted by using the encryption key transferred asynchronously with the encrypted data.

DETAILED DESCRIPTION

Figure 1:
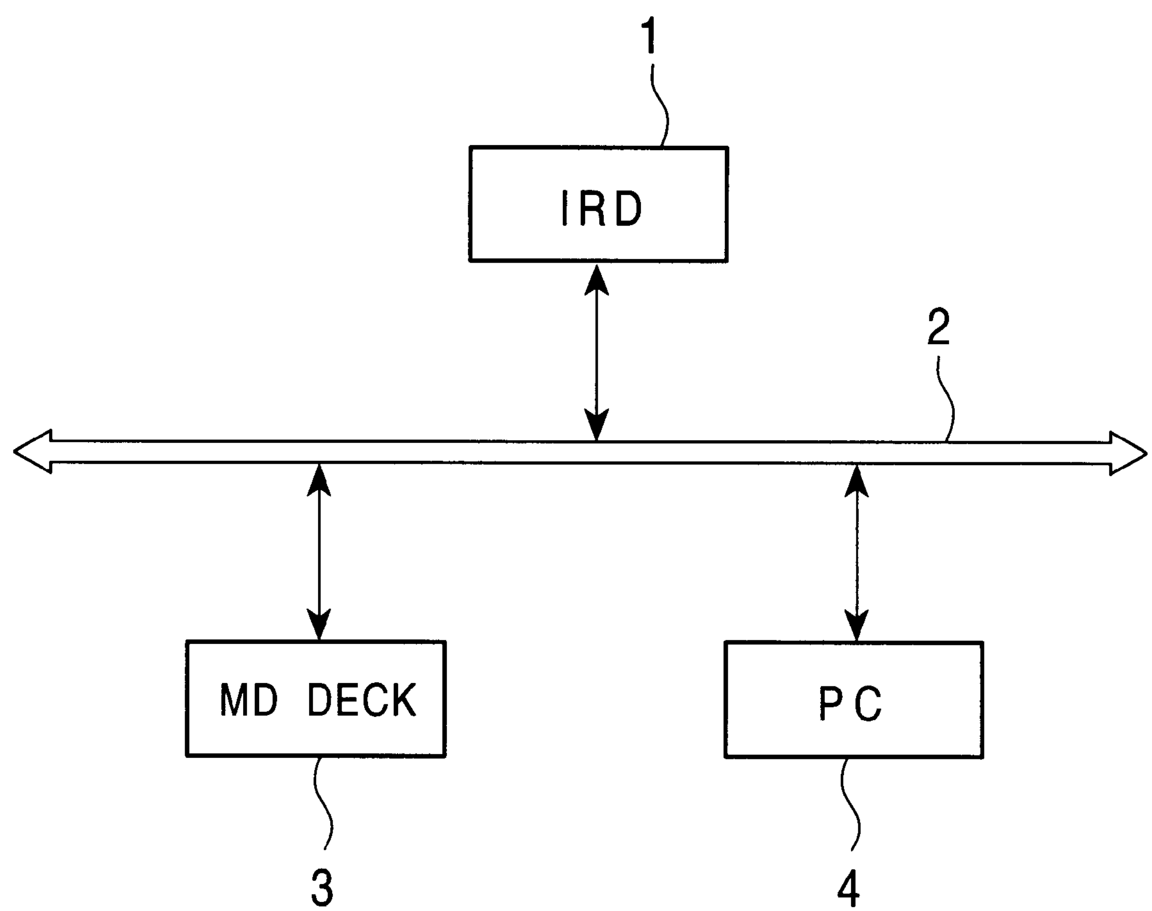
FIG. 1 is a block diagram showing an example structure of an information communication system to which the present invention is applied.

An example structure of an information communication system to which the present invention is applied will be described below by referring to FIG. 1. In this system, an integrated receiver and decoder (IRD) 1 for receiving a digital satellite broadcasting signal and a MiniDisc® (MD) player/recorder 3 for recording input adaptive-transform-acoustic-coding (ATRAC) data onto a MiniDisc® and for reproducing the data are connected to each other through a communication bus 2 such as an IEEE-1394. Other electronic units (such as a personal computer (PC) 4) are also connected to the IEEE-1394 bus 2.

ATRAC data refers to data compression-encoded by a method employed when audio data is recorded onto a MiniDisc®.

In this system, the IRD 1 receives downloadable (recordable) audio data (ATRAC data) included in a digital satellite broadcasting signal, encrypts the data, and distributes it to the IEEE-1394 bus 2. The MD deck 3 receives the encrypted ATRAC data distributed through the IEEE-1394 bus 2, decrypts it, and records it onto a MiniDisc®.

Figure 2:
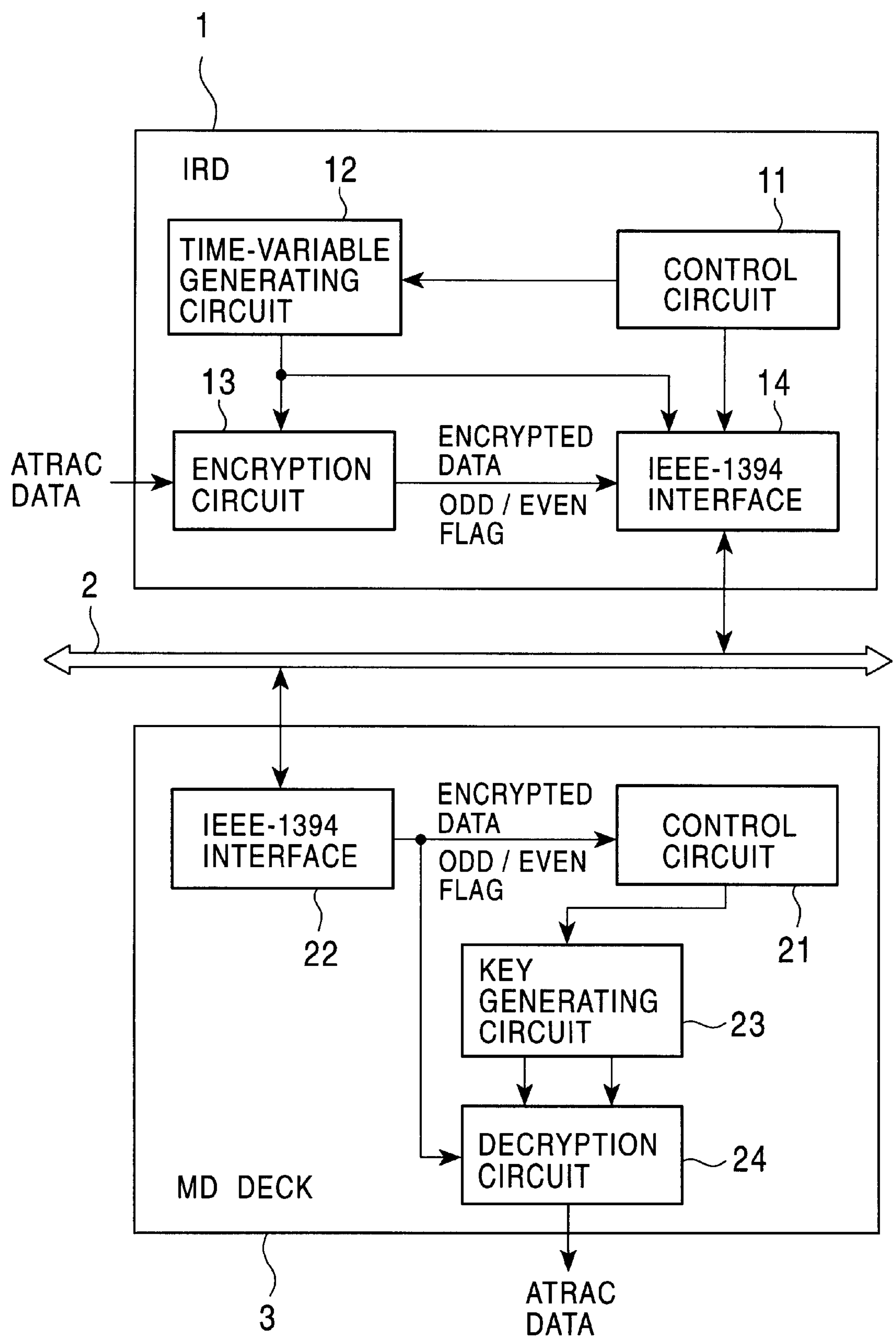
FIG. 2 is a block diagram showing detailed example structures of an IRD 1 and an MD deck 3 shown in FIG. 1.

FIG. 2 shows a detailed example structure of portions related to data communication in the IRD 1, serving as the data transmitting side, and the MiniDisc® deck 3, serving as the data receiving side. The control circuit 11 of the IRD 1 controls the IRD 1 according to a program recorded into a built-in memory. A time-variable generating circuit 12 generates a time variable which is, for example, incremented by one at an interval of 30 seconds according to the control of the control circuit 11, and sends it to an encryption circuit 13 as an encryption key.

The encryption circuit 13 encrypts the ATRAC data input from the tuner (not shown) of the IRD 1 by using the encryption key sent from the time-variable generating circuit 12, adds a flag (ODD/EVEN flag) indicating that the used encryption key is odd or even to the obtained encrypted data, and outputs them to an IEEE-1394 interface 14. The IEEE-1394 interface 14 stores the encrypted data (with the ODD/EVEN flag added) input from the encryption circuit 13 in a built-in FIFO buffer, packetizes it sequentially, and outputs to the IEEE1394 bus 2. The IEEE-1394 interface 14 also determines, in response to an authentication request sent from the IEEE-1394 interface (such as the IEEE-1394 interface 22 of the MD deck 3) of another electronic unit connected to the IEEE-1394 bus 2, whether the electronic unit is legitimate (whether it does not abuse ATRAC data for which the copyright is protected), and sends the currently used encryption key to the electronic unit as the initial value according to the result of the determination by asynchronous communication through the IEEE-1394 bus 2.

The control circuit 21 of the MD deck 3 controls the MiniDisc deck 3 according to a program stored in a built-in memory in response to the ODD/EVEN flag of the encrypted data input from the IEEE-1394 interface 22. The IEEE-1394 interface 22 receives the ATRAC data distributed through the IEEE-1394 bus 2, and outputs it to the control circuit 21 and to a decryption circuit 24. A key generating circuit 23 increments the encryption key input as the initial value by one according to the control of the control circuit 21 to alternately generate an odd-numbered encryption key (ODD key) and an even-numbered encryption key (EVEN key) and sends to the decryption circuit 24.

The decryption circuit 24 decrypts the encrypted data by using either the ODD key or the EVEN key sent from the key generating circuit 23, which corresponds to the flag of the encrypted data input through the IEEE-1394 interface 22, and outputs the obtained ATRAC data to subsequent circuits (such as a recording processing circuit).

Figure 3:
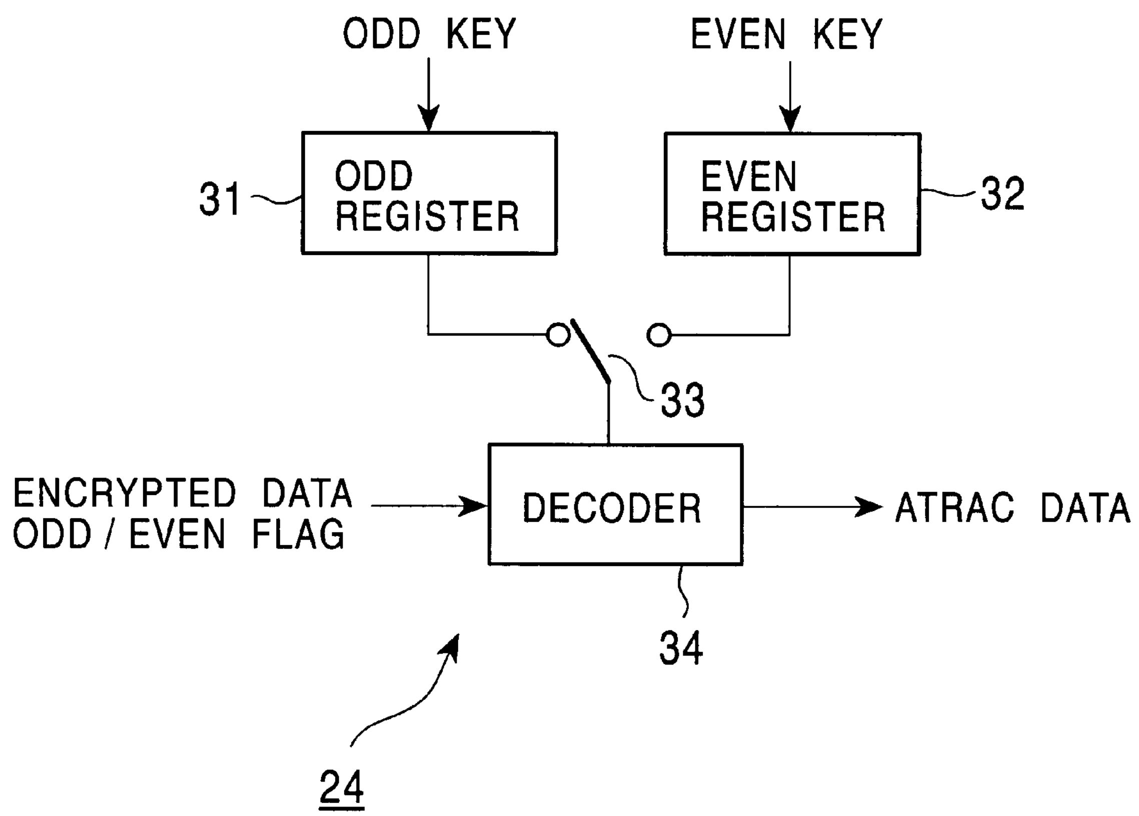
FIG. 3 is a block diagram showing a detailed example structure of a decryption circuit 24 shown in FIG. 2.

FIG. 3 shows a detailed example structure of the decryption circuit 24 shown in FIG. 2. As shown in the figure, the ODD key, sent from the key generating circuit 23, is stored in an ODD register 31 and the EVEN key is written into an EVEN register 32 in the decryption circuit 24. A decoder 34 reads the flag of the encrypted data input through the IEEE-1394 interface 22, switches a switch 33 according to the flag to read the encryption key (ODD key or EVEN key) corresponding to the flag, and decrypts the encrypted data by using the read encryption key.

The timing when encrypted data is sent to the decryption circuit 24 is delayed from the timing when the IRD 1 encrypts the original ATRAC data, due to processing at the IEEE-1394 interfaces 14 and 22 or the degree of congestion in the communication band of the IEEE-1394 bus 2.

Figure 4:
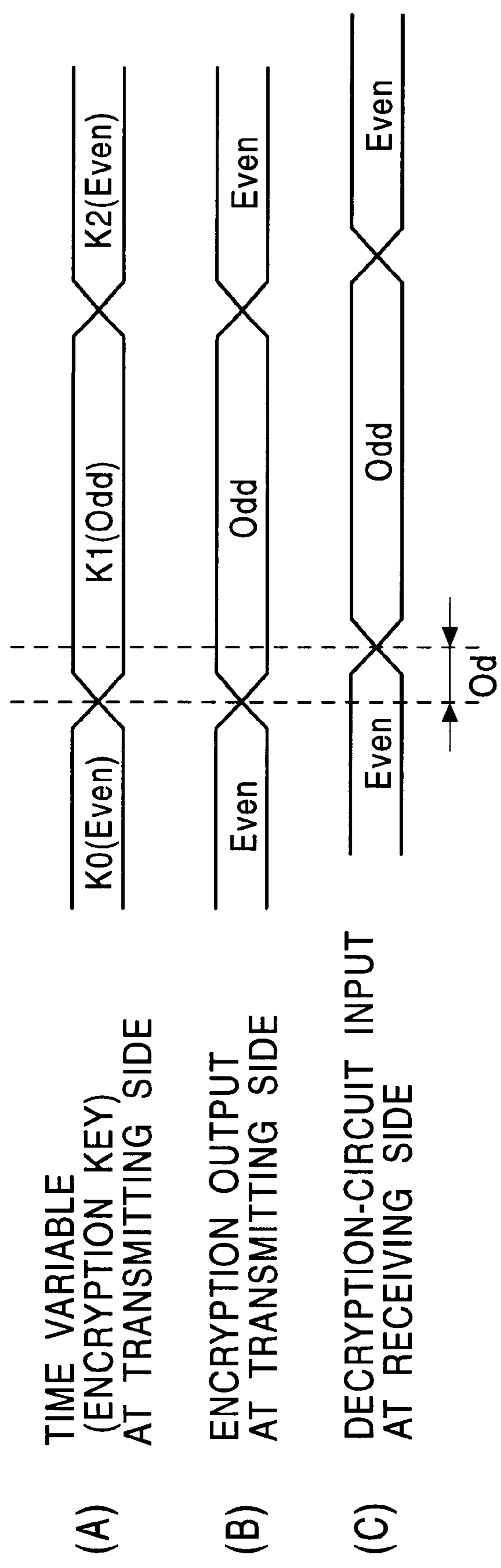
FIG. 4 is a time line showing a communication delay of encrypted data.

This delay will be described below by referring to FIG. 4. When the time-variable generating circuit 12 updates the time variable (encryption key) at the timing shown in (A) of FIG. 4, for example, the flag added to the encrypted data output from the encryption circuit 13 changes at the same time as the time variable, as shown in (B) of FIG. 4. The time when the encrypted data is received by the IEEE-1394 interface 22 of the MiniDisc® deck 3 through the IEEE-1394 bus 2 and is sent to the decryption circuit 24 is delayed by the period Od as shown in (C) of FIG. 4.

Figure 5:
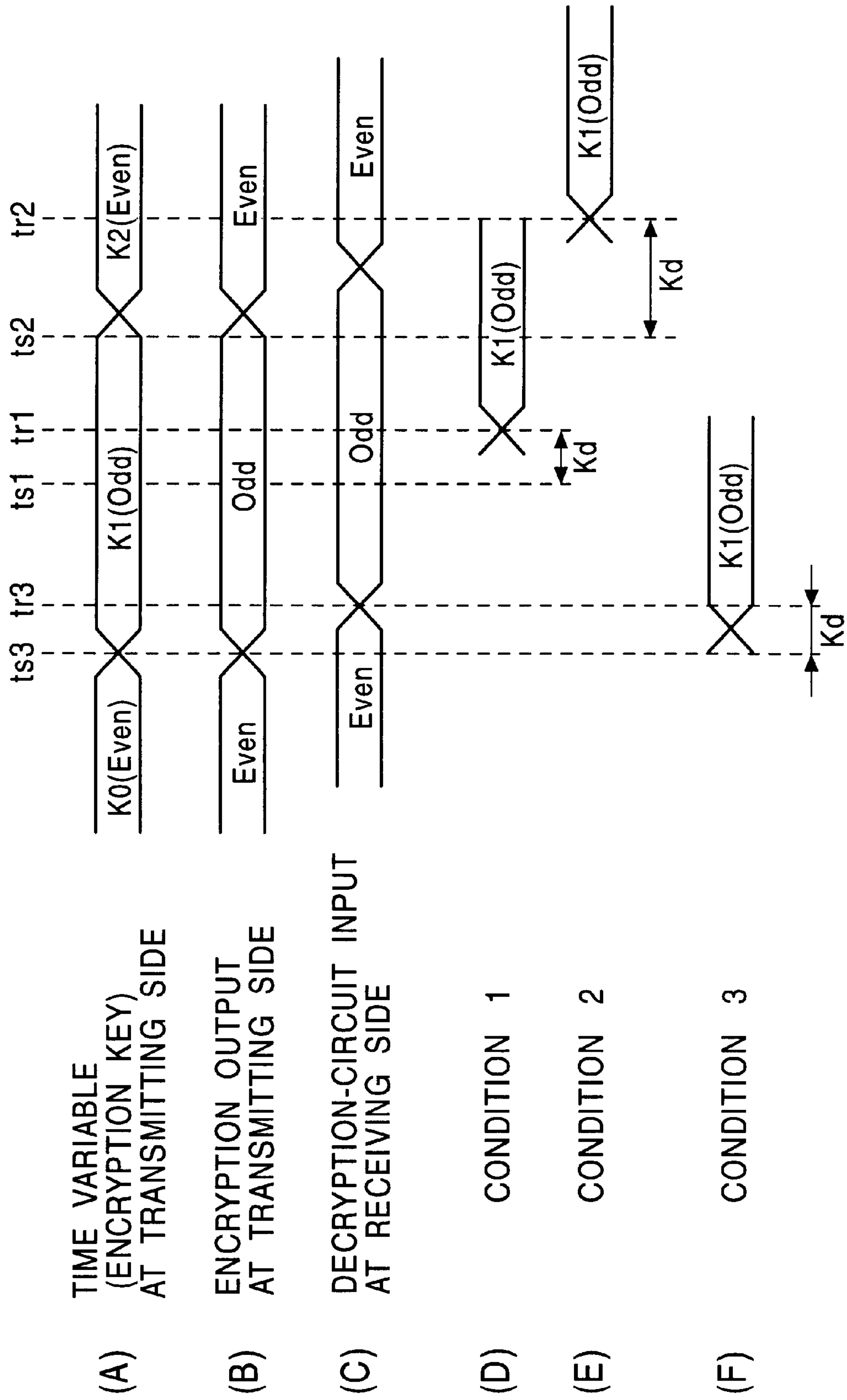
FIG. 5 is a time line showing a communication delay of an encryption key.

The time when the ODD and EVEN keys are generated according to the initial value are sent to the decryption circuit 24 is delayed from the time when the IRD 1 sends back the currently used encryption key as the initial value by asynchronous communication in response to a request from the IEEE-1394 interface 22 of the MiniDisc® deck 3, in one of three conditions shown in (D) to (F) of FIG. 5. The delays are caused by the processing times of the IEEE-1394 interfaces 14 and 22, the key generating circuit 23, and the degree of congestion in the communication band of the IEEE-1394 bus 2.

Condition 1 (D) of FIG. 5 shows the time delay incurred when the IEEE-1394 interface 14 of the IRD 1 sends back the currently used encryption key as the initial value at time ts1 and the ODD key and the EVEN key generated according to the initial value are sent to the decryption circuit 24 at time tr1. Condition 2 (E) of FIG. 5 shows the time delay incurred when the IEEE-1394 interface 14 of the IRD 1 sends back the currently used encryption key as the initial value at time ts2 and the ODD key and the EVEN key generated according to the initial value are sent to the decryption circuit 24 at time tr2. Condition 3 (F) of FIG. 5 shows the time delay incurred when the IEEE-1394 interface 14 of the IRD 1 sends back the currently used encryption key as the initial value at time ts3 and the ODD key and the EVEN key generated according to the initial value are sent to the decryption circuit 24 at time tr3. Since the initial value of the encryption key is transferred by asynchronous communication as described above, the delay time Kd is not necessarily equal to the delay time Od of the encrypted data. Because (A) to (C) of FIG. 5 are identical to (A) to (C) of FIG. 4, the description thereof will be omitted.

In the condition 1 shown in (D) of FIG. 5, the encryption key (ODD key) k1 serving as the initial value is written into the ODD register 31 of the decryption circuit 24 at the time tr1, and the encryption key (EVEN key) K2, which is obtained by incrementing the encryption key (ODD key) k1 by one, is written into the EVEN register 32 at the same time. Therefore, when the switch 33 is switched to the ODD-register 31 side according to the flag (ODD) of the encrypted data (data (C) of FIG. 5) encrypted by the encryption key k1) input to the decoder 34, correct decryption is enabled. Each time the flag of subsequent encrypted data changes, the switch 33 is switched and the encryption key stored in the register which has not yet been read is updated to continue correct decryption.

In the condition 2 shown in (E) of FIG. 5, the encryption key (ODD key) K1 serving as the initial value is written into the ODD register 31 of the decryption circuit 24 at time tr2, and the encryption key (EVEN key) K2, which is obtained by incrementing the encryption key (ODD key) K1 by one, is written into the EVEN register 32 at the same time. Therefore, when the switch 33 is switched to the EVEN-register 32 side according to the flag (EVEN) of the encrypted data (data ((C) of FIG. 5) encrypted by the encryption key K1) input to the decoder 34, correct decryption is enabled. Each time the flag of the encrypted data obtained immediately after is changed, the encryption key stored in the ODD register 31 is updated to K3 and is the switch 33 is switched to the ODD-register 31 side. Each time the flag of subsequent encrypted data changes, switch 33 is switched and the encryption key stored in the register which has not yet been read is updated to continue correct decryption.

In the condition 3 shown in (F) of FIG. 5, the encryption key (ODD key) k1 serving as the initial value is written into the ODD register 31 of the decryption circuit 24 at time tr2, and the encryption key (EVEN key) K2, which is obtained by incrementing the encryption key (ODD key) k1 by one, is written into the EVEN register 32 at the same time. Even when the switch 33 is switched to the EVEN-register 32 side according to the flag (EVEN) of the encrypted data (data ((C) of FIG. 5) encrypted by the encryption key K1) input to the decoder 34 at time ts or time tr3, since the encryption key K2 has been written into the EVEN register 32, encrypted data encrypted by the encryption key K0 cannot be decrypted. At the time when the flag of the encrypted data obtained immediately after is changed, the switch 33 is just switched to the ODD-register 31 side and the encryption keys stored in the registers 31 and 32 are not updated. Every time when the flag of subsequent encrypted data is changed, the switch 33 is switched and then the encryption key stored in the register which has not yet been read is updated to continue correct decryption.

The receiving processing of the MD deck 3 corresponding to the above-described conditions 1 to 3 will be described below by referring to flowcharts shown in FIG. 6 to FIG. 8. The receiving processing is started when the user issues a predetermined receiving-start instruction in a state in which the IRD 1 has already distributed encrypted data to the IEEE-1394 bus 2. With this operation, the IEEE-1394 interface 22 receives encrypted data (with the ODD/EVEN flag being added) and outputs to the control circuit 21 and to the decryption circuit 24.

In step S1, the control circuit 21 of the MD deck 3 controls the key generating circuit 23 and the decryption circuit 24 to start key-register writing processing (details will be described later by referring to a flowchart shown in FIG. 7). With this key-register writing processing, the ODD key and the EVEN key are written into the ODD register 31 and the EVEN register 32, respectively, which are part of the decryption circuit 24.

In step S2, the key generating circuit 23 determines whether the user has issued a receiving termination instruction. When it is determined that a receiving termination instruction has not yet been issued, the processing proceeds to step S3. In step S3, the decoder 34, built in the decryption circuit 24, reads the ODD/EVEN flag added to encrypted data, and determines in step S4 whether the flag is an ODD flag or an EVEN flag.

When it is determined that the flag is an ODD flag, the processing proceeds to step S5. In step S5, the decoder 34 switches the switch 33 to the ODD-register 31 side and reads an ODD key from the ODD register 31.

In step S7, the decoder 34 decodes the encrypted data input from the IEEE-1394 interface 22 by using the read encryption key (in this case, the ODD key). The obtained ATRAC data is output to a subsequent circuit and recorded onto a MiniDisc®.

When it is determined in step S4 that the flag is an EVEN flag, the processing proceeds to step S6. In step S6, the decoder 34 switches the switch 33 to the EVEN-register 32 side and reads an EVEN key from the EVEN register 32.

When it is determined in step S2 that a receiving termination instruction has been issued, this receiving processing is terminated.

The key-register writing processing in step S1 shown in FIG. 6 will be described below by referring to a flowchart shown in FIG. 7. This key-register writing processing is started when step S1 of the above-described receiving processing is executed, and is performed in parallel to the receiving processing.

In step S11, the IEEE-1394 interface 22 sends an authentication request according to the IEEE-1394 protocols to the IEEE-1394 interface 14 of the IRD 1 through the IEEE-1394 bus 2 under the control of the control circuit 21. In step S12, the IEEE-1394 interface 14 receives the authentication request sent from the IEEE-1394 interface 22 through the IEEE-1394 bus 2, and starts authentication processing for the IEEE1394 interface 22 accordingly. In step S13, the IEEE-1394 interface 14 determines whether the IEEE-1394 interface 22 is authenticated. When it is determined that the IEEE-1394 interface 22 is authenticated, the processing proceeds to step S14.

In step S14, the IEEE-1394 interface 14 transmits the encryption key currently used in the encryption circuit 13 and sent from the time-variable generating circuit 12, as the initial value (hereinafter called an initial key) Kx of the encryption key to the IEEE-1394 interface 22 through the IEEE-1394 bus 2. The IEEE-1394 interface 22 receives the initial key Kx and outputs it to the control circuit 21. In step S15, the control circuit 21 outputs the initial key Kx to the key generating circuit 23. The key generating circuit 23 generates the next key Kx+1 by incrementing the value of the initial key Kx from the control circuit 21, and outputs the keys Kx and Kx+1 to the decryption circuit 24. The decryption circuit 24 determines whether the keys Kx and Kx+1 output from the key generating circuit 23 are odd or even, and writes them into the ODD register 31 and the EVEN register 32 correspondingly.

In step S16, the control circuit 21 monitors (reads) the ODD/EVEN flag, added to encrypted data sequentially input from the IEEE-1394 interface 22. In step S17, the control circuit 21 determines whether the flag read in the step S16 has been changed (is different from that read before). The processing returns to step S16 and the subsequent process is repeated until it is determined that the flag has been changed. When it is determined that the flag has been changed, the processing proceeds to step S18.

In step S18, the control circuit 21 determines whether the new flag is ODD (whether the flag has been changed from EVEN to ODD) or EVEN (whether the flag has been changed from ODD to EVEN). When it is determined that the new flag is ODD, the processing proceeds to step S19.

In step S19, the control circuit 21 determines whether the smaller key (key Kx) of the two keys written into the registers 31 and 32 of the decryption circuit 24 is stored in the EVEN register 32. When it is determined that the key Kx is stored in the EVEN register 32, the processing proceeds to step S20. In step S20, the control circuit 21 updates the EVEN key written into the EVEN register 32. More specifically, the key generating circuit 23 increments the value of the EVEN key written into the EVEN register 32 by two and outputs it to the decryption circuit 24 under the control of the control circuit 21. The decryption circuit 24 writes the new EVEN key into the EVEN register 32 in a write-over manner.

When it is determined in step S19 that the key Kx is not written into the EVEN register 32, step S20 is skipped.

When it is determined in step S18 that the new flag is EVEN, the processing proceeds to step S21.

In step S21, the control circuit 21 determines whether the smaller key (key Kx) of the two keys written into the registers 31 and 32 of the decryption circuit 24 is stored in the ODD register 31. When it is determined that the key Kx is stored in the ODD register 31, the processing proceeds to step S22. In step S22, the control circuit 21 updates the ODD key written into the ODD register 31. More specifically, the key generating circuit 23 increments the value of the ODD key written into the ODD register 31 by two and outputs it to the decryption circuit 24 under the control of the control circuit 21. The decryption circuit 24 writes the new ODD key into the ODD register 31 in a write-over manner.

When it is determined in step S21 that the key Kx is not written into the ODD register 31, step S22 is skipped.

Then, the processing returns to step S16 and the subsequent processes are repeated until the receiving processing, executed in parallel, is terminated.

When it is determined in step S13 that the IEEE-1394 interface 22 is not authenticated, the IEEE-1394 interface 14 informs the IEEE-1394 interface 22 of the determination. Then, the processing returns to step S11, and the subsequent processes are repeated.

As described above, since the key-register writing processing (especially the processes after the step S18, for updating the encryption key according to the polarity of the change of the flag) is executed in parallel with the receiving processing, encrypted data is correctly decrypted according to the three types of conditions 1 to 3 ((D) to (F) of FIG. 5) in which the initial key is received.

Key checking processing is executed in parallel with the receiving processing and the key-register writing processing and will be described below by referring to a flowchart shown in FIG. 8. In step S31, the IEEE-1394 interface 22 requests the IEEE-1394 interface 14 of the IRD 1 to transmit the key currently being used for encryption, under the control of the control circuit 21. In response to this request, in step S32, the IEEE-1394 interface 14 transmits the encryption key being used by the encryption circuit 13 to the IEEE-1394 interface 22 through the IEEE-1394 bus 2. The encryption key is received by the IEEE-1394 interface 22 and is output to the control circuit 21.

In step S33, the control circuit 21 determines whether the encryption key input from the IEEE-1394 interface 22 matches the ODD key or the EVEN key written into the registers 31 and 32 of the decryption circuit 24. When it is determined that they match (in step S34), it is deemed that encrypted data has been correctly decrypted, the parameter n (described later) is initialized to zero, and the processing proceeds to step S37.

In step S37, the processing idles for a predetermined time (for example, about one tenth the time during which one encryption key is used in the encryption circuit 13 of the IRD 1). When the predetermined time elapses, the processing returns to step S31 and the subsequent processes are repeated.

When it is determined in step S34 that the encryption key input from the IEEE-1394 interface 22 does not match the ODD key or the EVEN key written into the registers 31 and 32 of the decryption circuit 24, the processing proceeds to step S35. In step S35, the control circuit 21 determines whether the determination in step S34 continuously shows a predetermined number of times (such as twice) that they do not match (unmatching is obtained a plurality of times continuously). When it is determined that unmatching is obtained a plurality of times continuously, the parameter is initialized to zero and the processing proceeds to step S38.

In step S38, the control circuit 21 outputs the encryption key requested in step S32 from the IEEE-1394 interface 22, to the key generating circuit 23. The key generating circuit 23 increments the value of the encryption key Kx output from the control circuit 21 by one to generate the next key Kx+1, and outputs the keys Kx and Kx+1 to the decryption circuit 24. The decryption circuit 24 determines whether the keys Kx and Kx+1 output from the key generating circuit 23 are even or odd, and writes them into the ODD register 31 and the EVEN register 32 accordingly.

When it is determined in step S35 that unmatching is not continuously obtained a plurality of times, the control circuit 21 increments the parameter n, which indicates the number of times unmatching is obtained in step S34, by one in step S36.

As described above, since it is checked periodically (at an interval of the idling time in step S37) that the encryption key used for encryption matches the encryption key used for decryption, even if the encryption key used for decryption is changed for some reason, correct decryption processing can be restarted.

Figure 6:
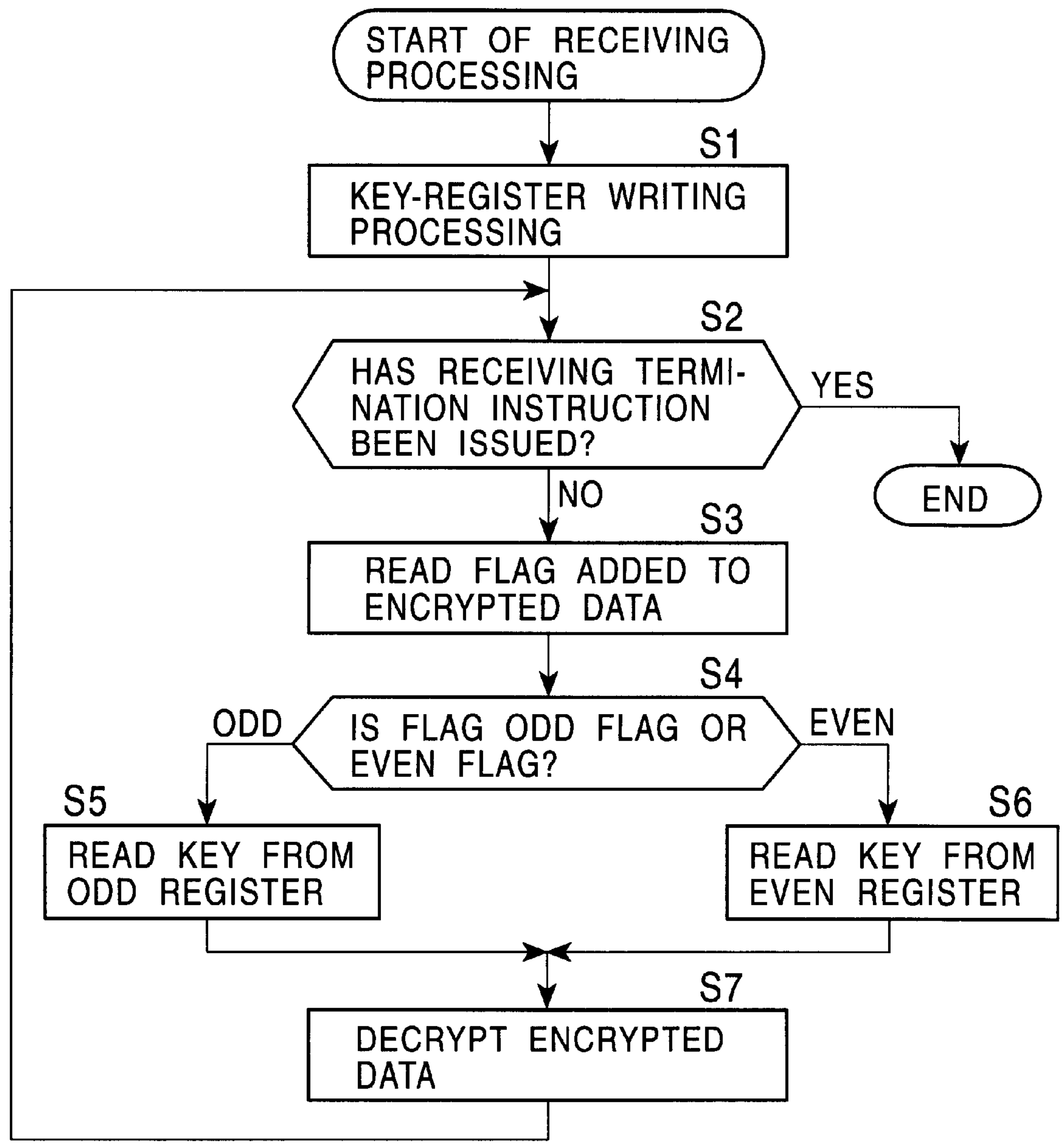
FIG. 6 is a flowchart of receiving processing.
Figure 7:
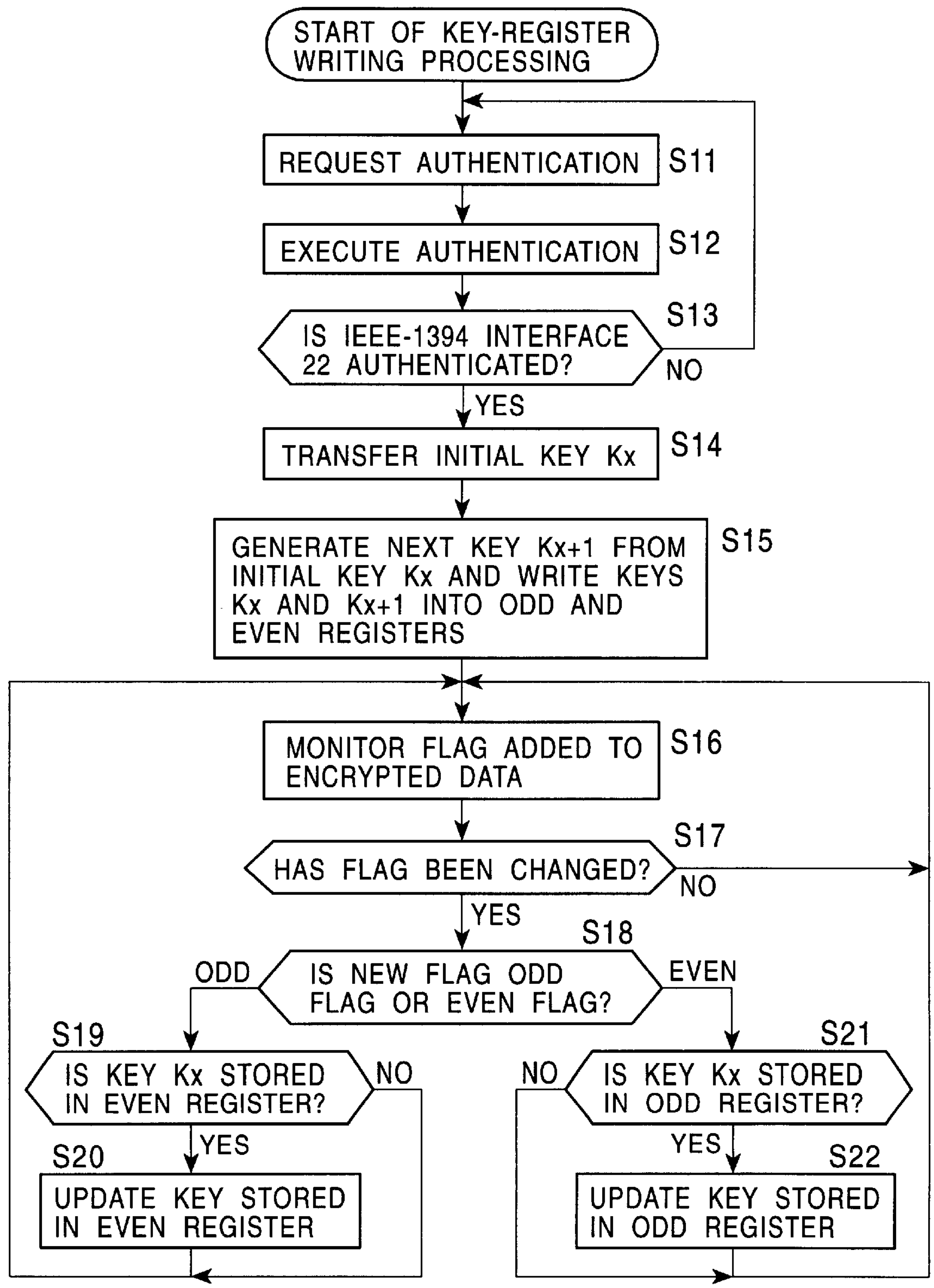
FIG. 7 is a flowchart of key-register writing processing.
Figure 8:
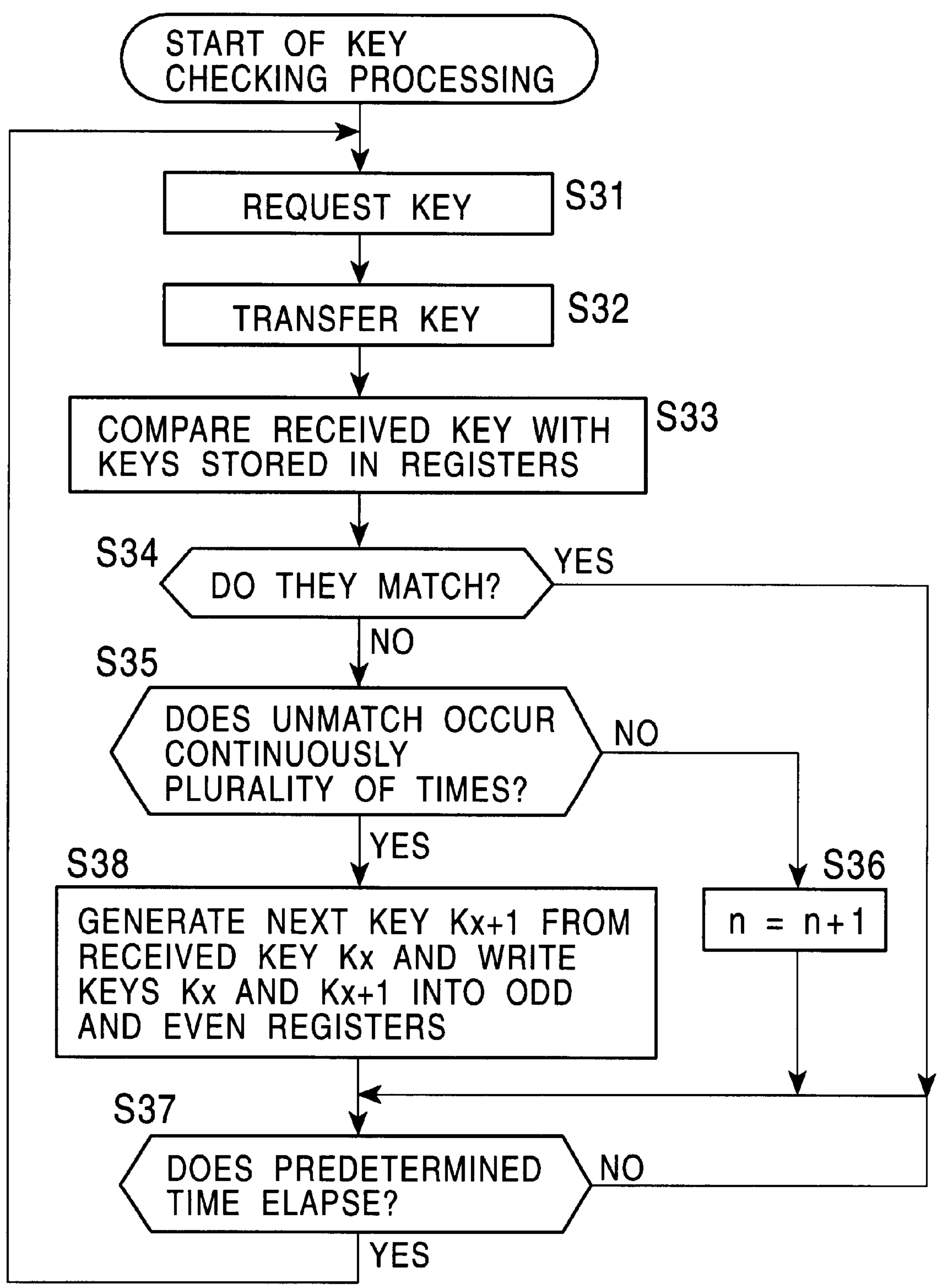
FIG. 8 is a flowchart of key checking processing.

Even if step S1 is skipped during the receiving processing shown in FIG. 6, namely, the key-register writing processing shown in FIG. 7 is not executed; the key checking processing shown in FIG. 8 is performed and correct decryption is allowed.

In the present embodiment, the IRD 1 serves as the transmitting side of encrypted data and the MD deck 3 serves as the receiving side. The present invention can also be applied to the data communication of other electronic units. Therefore, the type of data to be encrypted is not limited to ATRAC data and may be, for example, AV data (transport stream) conforming to the MPEG-2 method.

In addition, the present invention can be applied not only to communication between electronic units connected through the IEEE-1394 bus 2 but also to communication between personal computers connected through the Internet or a local area network (LAN).

The series of processing described above can be executed by software as well as hardware. When the series of processing is executed by software, a program constituting the software is installed in a computer which is built in the MD deck 3, serving as special hardware, or in, for example, a general-purpose personal computer which can execute various functions with various programs being installed.

A medium used for installing a program which executes the series of processing described above in a computer and for making the program ready in the computer will be described below by referring to FIGS. 9A, 9B, and 9C.

Figure 9A:
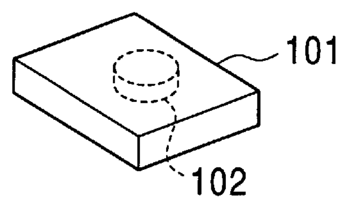
FIG. 9A, 9B, and 9C are views showing media used for installing a program into a computer and for making the program ready.

The program installed in advance on a hard disk 102 or a semiconductor memory 103, serving as a recording medium, built in a computer 101 (corresponding to the control circuit 21 shown in FIG. 2) can be distributed to the user as shown in FIG. 9A.

Figure 9B:
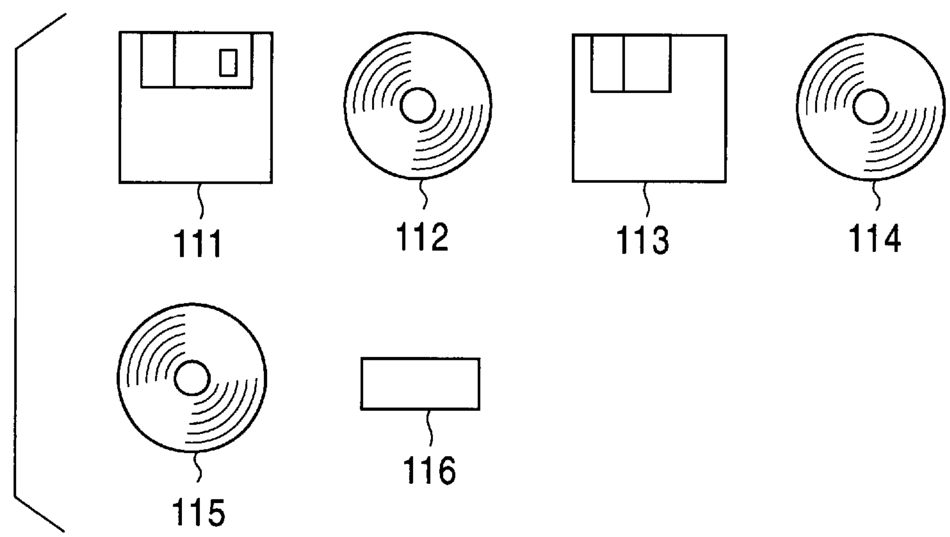

Alternatively, the program can be temporarily or permanently stored on a recording medium, such as a floppy disk 111, a compact-disc read-only memory (CD-ROM) 112, a magneto-optical (MO) disk 113, a digital versatile disc (DVD) 114, a magnetic disk 115, or a semiconductor memory 116, as shown in FIG. 9B, and offered as package software.

Figure 9C:
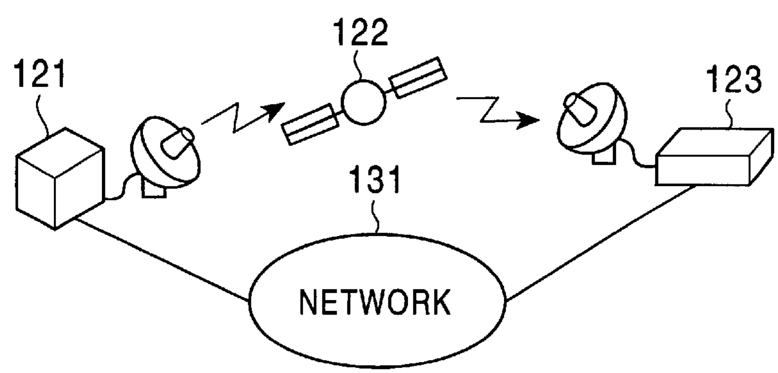

Furthermore, the program can be transferred from a download site 121 to a computer 123 through a satellite 122 by radio, or through a network 131, such as a local area network or the Internet, by wire or radio, and stored on a built-in hard disk in the computer 123, as shown in FIG. 9C.

In the present specification, media means a wide concept which includes all the media described above.

In the present specification, steps describing the program distributed by the media include not only executing the process in sequence according to the written order, but also processing which is not necessarily executed time-sequentially but performed in parallel or independently.

In the present specification, a system refers to the whole apparatus formed of a plurality of apparatuses.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A receiving apparatus for receiving data encrypted by an encryption key that is updated periodically, comprising:

obtaining means for obtaining an initial value of the encryption key;

generating means for generating a decryption key according to initial value of the encryption key;

receiving means for receiving the encrypted data;

reading means for reading a flag attached to the received encrypted data;

detecting means for detecting changes in a state of said flag and a polarity of each said change;

updating means for updating said decryption key in synchronization with each said change of said flag and in response to said polarity of each said change;

storage means for storing versions of said decryption keys corresponding to said changed states of said flag; and decrypting means for decrypting the received encrypted data using one of said stored versions of said decryption keys corresponding to said flag attached to the received encrypted data.

2. A receiving apparatus according to claim 1, further comprising:

checking means for periodically checking that the encryption key matches said decryption key; and changing means for changing said decryption key according to a result of said check.

3. A method for receiving data encrypted by an encryption key that is updated periodically, comprising:

obtaining an initial value of the encryption key;

generating a decryption key according to said initial value of the encryption key;

receiving the encrypted data;

reading a flag attached to the received encrypted data;

detecting changes in a state of the flag and a polarity of each said change;

updating the decryption key in synchronization with each said change of the flag and in response to the polarity of each said change;

storing versions of the updated decryption key corresponding to said changed states of the flag; and decrypting the received encrypted data using one of the stored versions of the decryption keys corresponding to the flag attached to the received encrypted data.

4. A medium stored with a program for receiving data encrypted by an encryption key that is updated periodically, the program comprising:

obtaining an initial value of the encryption key;

generating a decryption key according to said initial value of the encryption key;

receiving the encrypted data;

reading a flag attached to the received encrypted data;

detecting changes in a state of the flag and a polarity of each said change;

updating the decryption key in synchronization with each said change of the flag and in response to the polarity of each said change;

storing versions of the updated decryption key corresponding to said changed states of the flag; and decrypting the received encrypted data using one of the stored versions of the decryption keys corresponding to the flag attached to the received encrypted data.

5. A receiving apparatus for receiving data encrypted by an encryption key that is updated periodically, comprising:

obtaining means for obtaining an initial value of the encryption key;

generating means for generating a decryption key according to said initial value of the encryption key;

receiving means for receiving the encrypted data;

reading means for reading a flag attached to the received encrypted data;

storage means for storing versions of the decryption key generated by said generating means and corresponding to changed states of said flag;

decrypting means for decrypting the received encrypted data using one of the stored versions of the decryption keys corresponding to said flag attached to the received encrypted data;

updating means for updating the decryption key in synchronization with the changed states of said flag;

checking means for periodically checking that the encryption key matches one of the stored versions of the decryption key; and changing means for changing the decryption key according to the result of said checking means.

6. A method for receiving data encrypted by an encryption key that is updated periodically, comprising:

obtaining an initial value of the encryption key;

generating a decryption key according to said initial value of the encryption key;

receiving the encrypted data;

reading a flag attached to the received encrypted data;

generating versions of the decryption keys corresponding to the states of the flag;

storing the versions of the decryption key;

decrypting the received encrypted data using one of the stored versions of the decryption keys corresponding to the flag attached to the received encrypted data;

updating the decryption key in synchronization with the changed states of the flag;

checking periodically that the encryption key matches one of the stored versions of the decryption key; and changing the decryption key according to the result of the check.

7. A medium stored with a program for receiving data encrypted by an encryption key that is updated periodically, the program comprising:

obtaining an initial value of the encryption key;

generating a decryption key according to said initial value of the encryption key;

receiving the encrypted data;

reading a flag attached to the received encrypted data;

generating versions of the decryption keys corresponding to changed states of the flag;

storing the versions of the decryption key;

decrypting the received encrypted data using one of the stored versions of the decryption keys corresponding to the flag attached to the received encrypted data;

updating the decryption key in synchronization with the changed states of the flag;

checking periodically that the encryption key matches one of the stored versions of the decryption key; and changing the decryption key according to the result of the check.

* * * * *

UNITED STATES PATENT AND TRADEMARK OFFICE
CERTIFICATE OF CORRECTION

PATENT NO. : 6,785,390 B1
DATED : August 31, 2004
INVENTOR(S) : Hiroyuki Hiraide It is certified that error appears in the above-identified patent and that said Letters Patent is hereby corrected as shown below:

Column 4,
Line 40, "FIG." should read -- FIGS. --.

Column 6,
Lines 37, 40 and 45, "k" should read -- K --.

Column 7,
Line 5, "k" should read -- K --.

Column 11,
Lines 35, 39 and 63, "keys" should read -- key --.

Column 12,
Lines 15, 32, 49 and 53, "keys" should read -- key --.
Line 50, "the" should read -- changed -- (first occurrence).

Column 13,
Lines 3 and 7, "keys" should read -- key --.

Signed and Sealed this

Twenty-eighth Day of December, 2004

JON W. DUDAS
*Director of the United States Patent and Trademark Office*